(12) United States Patent
Minnebo et al.

(10) Patent No.: US 7,342,685 B2
(45) Date of Patent: Mar. 11, 2008

(54) CONSTRAINT CORRELATION FOR COMPUTER TO PLATE INKJET SYSTEM

(75) Inventors: Luc Minnebo, Brasschaat (BE); Koen Vande Velde, Duffel (BE); Paul Delabastita, Antwerp (BE)

(73) Assignee: Agfa Graphics NV, Mortsel (BE)

( * ) Notice: Subject to any disclaimer, the term of this patent is extended or adjusted under 35 U.S.C. 154(b) by 960 days.

(21) Appl. No.: 10/667,250

(22) Filed: Sep. 17, 2003

(65) Prior Publication Data
US 2004/0119994 A1   Jun. 24, 2004

(30) Foreign Application Priority Data
Sep. 17, 2002  (EP) ................... 02102364
Sep. 12, 2003  (EP) ................... 03103376

(51) Int. Cl.
*G06F 15/00* (2006.01)
(52) U.S. Cl. .................. 358/1.9; 358/516; 358/518; 358/529; 358/530; 347/15; 347/43; 347/5
(58) Field of Classification Search ............... 358/1.9, 358/516, 518, 529, 530; 347/15, 43, 5
See application file for complete search history.

(56) References Cited

U.S. PATENT DOCUMENTS

| 4,680,645 | A | 7/1987 | Dispoto et al. |
| 5,278,671 | A | 1/1994 | Takahashi et al. |
| 6,637,851 | B2 * | 10/2003 | Velde et al. ............ 347/15 |
| 2002/0104455 | A1 | 8/2002 | Deutsch et al. |
| 2004/0113958 | A1 * | 6/2004 | Minnebo et al. ............ 347/5 |

FOREIGN PATENT DOCUMENTS

| EP | 0702482 A2 | 3/1996 |
| EP | 1239662 A1 | 9/2002 |

OTHER PUBLICATIONS

Ostromoukhov et al., "Multi-Level Colour Halftoning Algorithms", Recent Progress in Digital Halftoning II, Mar. 1999, pp. 166-172.

* cited by examiner

*Primary Examiner*—Kimberly Williams
*Assistant Examiner*—Michael Burleson
(74) *Attorney, Agent, or Firm*—Robert A. Sabourin

(57) ABSTRACT

Printing masters are produced by use of an inkjet printing system.

The smallest halftone dot size which can be printed by the inkjet printing system is larger than the size of a pixel of the recording grid defined by the addressability of the printing device.

Inferior image quality and graininess caused by standard error diffusion algorithms in this system can be counteracted by using a constraint correlation error diffusion system.

Out of the complete set of all possible intensity level combinations for reproducing a pixel a subset is selected based upon the multilevel halftoning process of a quantized scalar value which is a function of at least one of the input pixel values of the corresponding colour component pixels.

Preferably the scalar value represents the brightness or ink amount allocations.

11 Claims, 10 Drawing Sheets

CONSTRAINT CORRELATION FOR COMPUTER TO PLATE INKJET SYSTEM

FIELD OF THE INVENTION

The present invention relates to a method for making printing masters in a computer to plate system.

More specifically the invention is related to making printing plates for colour printing by using an inkjet printing system.

BACKGROUND OF THE INVENTION

Printed articles are produced on a press using printing plates or printing masters which can work using different printing techniques:
Offset printing using ink repellent and ink attracting areas on the printing master,
Flexography using compressible relief printing plates,
Gravure printing,
Silk screen printing, etc.

For single colour (e.g. black and white) printing only a single printing master is needed.

For colour printing using more than 1 ink, a separate printing master is needed for each ink. The receiving layer passes sequentially the different printing masters on the press. A colour printing system that is often used makes overprints of yellow, magenta, cyan and black ink on paper. The four overlapping colour images combine to form a representation of the colour image.

Nowadays the printing masters are preferable fabricated using a Computer to Plate (CtP) system: the image to be reproduced is electronically provided in digital form, halftoned and is imaged directly on a printing plate precursor to obtain, after processing if required, a printing master used on a printing press.

A Ctp system comprises following a digital halftoning module and a recording apparatus.

Digital Halftoning Module

The input image delivered in an electronic form to the halftoning module is a continuous-tone image, i.e. a digital image containing pixels, which are the smallest picture elements, having multiple grey levels and/or colour levels with no perceptible color or tone quantization to them. Usually each colour component is represented by an eight bit value that can represent 256 different levels.

In a standard printing process, however, only two levels are possible corresponding to the presence of either ink or no ink. In what is called "multilevel printing systems" more than two printing grey levels are possible (for example five or seventeen), but usually this number is still not sufficient to enable the continuous tone rendering of images.

In the halftoning module the continuous-tone input image that contains a full range of tones from white through intermediate to full tone, is converted into an output image having output pixels wherein only those grey levels are present that are printable.

In the binary halftoning of black and white images, the output values correspond to either black or white, and likewise the result of binary halftoning in colour printing is either full colour or no colour.

In multilevel halftoning the continuous-tone image is converted to an image with pixels having a value out of at least 3 different levels. The pixel may be white, black or can have an intermediate grey value. Besides no ink deposition in printing, multiple levels of ink can be placed on a pixel.

A digital halftoning technique converts the multiple density values of the input pixels of a continuous tone input image into a geometric distribution of binary or multilevel halftone dots that can be printed by the reproduction device.

Each halftone dot is reproduced as a microdot or as a clustered set of microdots. A microdot is the smallest element that can be written by a reproduction device.

When the halftone dots are small enough, the eye is not capable of seeing the individual halftone dots, and only sees the corresponding spatially integrated density value of the geometric distribution.

The two main classes of halftoning techniques that are used are known as "amplitude modulation screening" (abbreviated as AM screening) and "frequency modulation screening" (abbreviated as FM screening).

According to amplitude modulation screening, the halftone dots, that together give the impression of a particular tone, are arranged on a fixed geometric grid. By varying the size of the halftone dots, the different tones of an image can be simulated. FIG. 1 shows a degrade rendered with AM screening.

According to frequency modulation screening, the distance between the fixed sized halftone dots is modulated to render different tone values. FIG. 2 shows the same degrade as in FIG. 1, but rendered with FM screening. Frequency modulation is sometimes called "stochastic screening", because most FM screening algorithms produce halftone dot patterns that are stochastic (non-deterministic) in nature.

Three methods are widely used to produce FM screens.

A first method relies on comparing an image on a pixel-by-pixel basis with a threshold function to obtain FM-screened images. Methods to obtain such a threshold function are described in the patents U.S. Pat. No. 5,535,020, U.S. Pat. No. 5,745,259, U.S. Pat. No. 5,912,745 and U.S. Pat. No. 6,172,773 by Robert Ulichney and in the patents U.S. Pat. No. 5,543,941, U.S. Pat. No. 5,708,518 and U.S. Pat. No. 5,726,772 by Theophano Mitsa and Kevin Parker.

Lawrence Ray and James Sullivan explain a second method in WO91/12686. According to this method, continuous tone images are directly converted into frequency modulation halftones by addressing in a tone dependent way pre-calculated bitmaps that are stored in a memory.

A third method for frequency modulation was originally invented by Floyd and Steinberg and is called error diffusion. FIG. 3 explains how it works.

The continuous tone pixel values P have a range from 0.0 (full black) to 1.0 (full white). A modified pixel value Pi of the unscreened image is compared with a fixed threshold T. If Pi is smaller than T, Hi is set to 0.0 and a black pixel is printed, else Hi is made equal to 1.0 and a white pixel is defined. The binarization of Pi introduces a quantization error Ei equal to Pi-Hi. According to the error diffusion scheme, this quantization error value is added to one or more of the unscreened pixels $P_{i+x,j+y}$, thereby generating a modified pixel value for $P_{i+x,j+y}$. Different pixels receive different fractions of the original error and this is controlled by means of "diffusion weights" $c_1$ to $c_n$. The sum of the diffusion weights always adds up to one. Because this scheme acts like a feedback loop, the average quantization error value converges to zero in steady state.

Robert Ulichney describes a number of enhancements over the original error diffusion algorithm in U.S. Pat. No. 4,955,065. This patent describes the use of a serpentine scan to process the input pixel values, the addition of noise on the threshold and the perturbation of the error diffusion weights to obtain more a uniform and isotropic halftone dot distribution.

Significant improvements of the original error diffusion scheme are also described in the patents U.S. Pat. No. 5,045,952 and U.S. Pat. No. 5,535,019, both by Reiner Eschbach. According to the disclosure in these patents, the threshold is modulated to either obtain an edge enhancement effect (first patent) or to improve the homogeneity of the halftone dot distributions in high and low intensity image regions (second patent). In U.S. Pat. No. 5,070,413 James Sullivan explains an improvement for screening colour images by performing error diffusion in a colorant vector space as opposed of doing scalar error diffusion for each of the colorants individually. Koen Vande Velde presented a further improvement of this idea at the International Conference on Digital Printing Technologies conference (proc. NIP17, IS&T 2001), which cal also be found in EP1 239 662. His algorithm consists of a vector error diffusion scheme in which the quantization of a colour into a set of inks is constrained by the output from an additional pre-processing step in such a way that luminance variations— and correspondingly halftoning graininess—are minimised in the final output. In U.S. Pat. No. 5,565,994 by Eschbach proposes a method that aims for a similar objective but works differently.

An improvement that is relevant with regard to our invention is also found in U.S. Pat. No. 5,087,981. In this patent Yee Ng describes the use of a printer model that takes into account halftone dot overlap to compensate for the non-linearity of printer gradation. In U.S. Pat. No. 5,854,882 by Shenge Wang, a practical method is described to characterise the dot overlap of a printer. Similar concepts regarding introducing printer models and models of the human visual system are described in the articles "Measurement of printer parameters for model based halftoning" by Thrasyvoulos N. Pappas, Chen-Koung Dong and David L. Neuhoff, published in the Journal of Electronic Imaging, July 1993 Vol. 2(3), pp 193-204. David Neuhoff patents some of the concepts presented in this article in U.S. Pat. No. 5,463,472. In U.S. Pat. No. 6,266,157, Zhigang Fan also explains a practical and efficient approach to model and calibrate the effects of dot overlap into an error diffusion scheme.

Victor Ostromoukhov points out in his presentation "A Simple and Efficient Error-Diffusion Algorithm", published in the proceedings of the SIGGRAPH2001 conference, that more uniform halftone dot distributions are obtained at various tone values by adjusting the diffusion weights as a function of tone.

A shown in FIG. 4, in the standard FM halftoning algorithms, it is implicitly assumed that the size of the printed microdots 1 is in the same order as the size of the pixels 2 of the addressable grid of the printer and also corresponds with the size of the pixels in the original image. This assumption can create problems in printing processes where halftone dots with the size of one pixel are too small to be properly rendered. An example of such a printing process is the electrophotographic printing process. A possible solution for this problem is disclosed in U.S. Pat. No. 5,374,997 by Reiner Eschbach in which he proposes the use of an error diffusion method that makes the halftone dot n by m times larger than the size of the addressable pixels of a printer.

In one of the embodiments he explains that by means of counters the preliminary output pixels of an error diffusion process can be replicated N times horizontally and M times vertically to obtain larger halftone dots 3. The output of this scheme for the case that N=M=2 is shown in FIG. 5.

When a single colour is used in printing, the error diffusion algorithm has to be applied to the single colour.

When multicolour printing is used, each colour component needs to be processed by the halftoning algorithm.

The Recording Apparatus

The most widely used CtP system in the graphic world is a system makes use of a laser recorder for making a printing master.

Usually an infrared laser system exposes microdots corresponding to pixels on the printing plate precursor. Small spots are irradiated on the plate wherein the radiation induces chemical or structural changes within the printing plate precursor and after imaging and processing (depending upon the type of printing plate) a ready to use printing master is obtained.

In U.S. Pat. No. 6,071,369 an external drum recorder is used. Following examples are given regarding spot size etc . . . :

Infrared laser emitting at 1.06 µm with a scan speed of 17 m/s, spot size of 10 µm and energy in the plane of 248 mJ/cm$^2$. Dwell time of the laser spot can be determined at 0.7 µs.

Infrared laser emitting at 1.06 µm with a scan speed of 2.2 m/s, spot size of 10 µm and an energy in the plane of 248 mJ/cm$^2$. Dwell time of the laser spot can be determined at 4.8 µs.

For each laser recording system following characteristics are important:

Dot Size

The dots that are imaged on the printing plate precursor can have different sizes. Preferably a CtP system writes microdots having a constant size. The dot size usually is in de range of 7 µm to 20 µm—depending upon the application.

Addressability

Another property of a Ctp system is the addressability. This indicates the precision by which a microdot can be positioned on the plate and is usually expressed in the number of pixels/mm or pixels/inch. All possible locations where a dot can be placed form a square (or sometimes rectangular) grid.

In laser recorders, small dots are placed within the grid to form the image to be reproduced. The grid can have a resolution up to 2400 dpi (e.g. in the AGFA Xcalibur thermal platesetter). This corresponds to an addressable pixel size of about 10 µm.

The shape and size of a laser spot in a recording system are usually designed so that the microdots can completely fill the addressable grid with, however, a minimum of overlap. Micro dot size and the size of an addressable pixel therefore are closely related to each other.

Recently also CtP processes using inkjet recording systems are suggested for preparing printing plates. An example of such a system and the elements in it is shown in FIG. 6. The printing plate precursor 4 in this example is mounted on a rotating drum 5 and an inkjet printing head 6 mounted aside the drum 5 jets ink or a reactive fluid onto the printing plate precursor 4 while the drum 5 rotates. As the drum 5 rotates, the inkjet printhead 6 slowly traverses the length of the drum 5 and a complete image is recorded pixel by pixel, line by line. Normally the inkjet printhead 6 has several nozzles 7 to jet ink so that multiple lines 8 can be recorded during a single rotation.

The inkjet printhead 6 consists of a plurality of separate tiny chambers containing ink coupled to an ink supply and each having a nozzle 7 at the end.

With thermal inkjet technology, tiny resistors rapidly heat a thin layer of liquid ink. The heated ink causes a vapour bubble to be formed, expelling or ejecting drops of ink through the nozzles 7 and placing them precisely on a surface to form text or images. As the bubble collapses, it creates a vacuum that pulls in fresh ink. This process is repeated thousands of times per second. With thermal inkjet technology, water-based inks are used. Piezoelectric inkjet technology pumps ink through nozzles 7 using pressure like in a squirt gun. A piezoelectric crystal is used to drive a very precise pump that ejects ink onto a printing medium. A wide range of ink formulations including solvent and water based and UV-curable) are compatible with the piezoelectric inkjet process.

By jetting drops of fluid, plate properties are locally influenced by chemical reaction or a printing master is formed by the properties of the image-wise applied ink itself. Some examples can be found in U.S. Pat. No. 5,275, 689, U.S. Pat. No. 6,187,280, and it is also possible to form a relief printing plate directly on the plate precursor.

In US 2003/007052 a method and apparatus is described for production of lithographic printing plates using an inkjet printing system. No indication is given regarding drop volume or dot size.

The most important characteristics of an inkjet printing system for creating a printing master are:

Droplet Volume and Dot Size:

The drop jetted to the printing plate precursor has an effect on only a limited area of the plate. For known printing systems, it was measured that a droplet volume of 3 picoliter that is printed on an receiving layer in aluminium, normally results in a dot having a diameter of 20-30 µm. The resulting size of the dot on the plate is mainly affected by the surface tension effects between the liquid and the aluminium substrate.

Addressability

In modern inkjet printing systems addressability is high. Accurate positioning systems and printheads allow for the use of a grid having a resolution 115 dots/mm (2875 dpi) and more.

A example of a recording grid and printed dots in inkjet printing is shown in FIG. 7.

In this particular case, it is clear that size of the halftone dot is significantly larger than the size of an addressable pixel. This situation is different from the laser-based system.

Ctp systems using inkjet offer distinct advantages.
  There is no need for processing of the printing plate with a special developer after the image is jetted onto the plate. An aqueous developer is all that is needed. No extra chemical for development of the image is needed resulting in a more ecological production method. This allows for easy and inexpensive fabrication of printing plates.
  No special dark room conditions are needed. This results in shorter production times and also opens up the possibility for on-press imaging.
  Returning to the subject digital halftoning and error diffusion in particular, we have to mention that the current state of the art algorithms have a number of certain drawbacks that are of importance with regard to our invention.

Artifacts Near "Rational Tonal Values" (1/2, 2/4, 3/4, 1/9, 2/9, 3/9, etc.)

A first problem of the original error diffusion as published by Floyd and Steinberg, is that it does not behave well around the tone value of 1/2 and tone values that are multiples of 1/4 and 1/3. At and around these tone values, the standard error diffusion algorithm produces halftone dot distributions that are highly phase correlated, i.e. the dot distributions tend to be organized in locally regular, self-repeating patterns.

To explain why this problem occurs, we will concentrate first on the behavior of the Floyd and Steinberg algorithm near 50%. When Floyd and Steinberg error diffusion is performed on a tint with exactly a 50% tone value, all of the halftone dots are laid out in a checkerboard configuration. This pattern is indeed the most optimal distribution of halftone dots for this tint as it minimizes the average distance between the dots and hence also minimizes the visibility of the halftone dot pattern. For tone values just above 50% tone value, however, the algorithm will introduce an extra white pixel here and there in order to produce the correct average tone value. This extra white pixel will inevitably disturb the phase of the checkerboard pattern. FIG. 8 shows an example in which a tone value of 128/255 was rendered by means of standard Floyd and Steinberg error diffusion. These local phase shifts disturb the otherwise regular pattern, and are picked up by the eye as a disturbing artifact. A similar situation occurs for tone values just below 50%.

A similar problem also exists around the 75% tone value. At exactly 75%, Floyd and Steinberg error diffusion produces a pattern in which one out of four pixels is black and three out of four pixels are white, with all the pixels arranged in a repeating two by two matrix pattern. Just above and below this tone value, this regular pattern is disturbed by the introduction of an extra white or black pixel. An example of a 192/255 tonal value rendered with Floyd and Steinberg is shown in FIG. 9. A similar behavior is seen around a tonal value of 25% and near tonal values that are multiples of 1/9 or 1/16.

Robert Ulichney already recognized the above problems, and the method he proposes in U.S. Pat. No. 4,955,065 is effective in reducing the above undesirable artifacts. However, the use of a random element in his algorithm also introduces graininess into the image. Furthermore does his method diffuse the artifacts, rather than fundamentally suppressing them.

This statement is appreciated by comparing the halftone rendered with standard Floyd and Steinberg error diffusion and shown FIG. 8 with the halftone rendered using the improved method according to Ulichney and shown in FIG. 10.

It is an objective of the invention to avoid the introduction of objectionable artifacts in FM screening without introducing graininess in the halftoned image.

Phase Correlated Dot Positions may Introduce Low Frequency Graininess or Patterns in Color Printing A consequence of correlated dot positions within a single separation is that it indirectly leads to phase correlation of the dot positions in the different ink separations in the case of color printing. This may introduce low frequency artifacts such as patterns and noise. Moreover, these artifacts shift and change unpredictably in the presence of misregistration between the separations.

We explain this by means of an example. Imagine a color that is printed with cyan and magenta ink separations, both having a value of 128/255. The Floyd and Steinberg algorithm produces for these tint values dot distributions that look like in FIG. 11A and FIG. 11B.

When these two separations are printed on top of each other in nearly perfect register as in FIG. 11C, they produce four possible ink overlap combinations: no ink, only cyan ink, only magenta ink, or cyan and magenta ink overprints. Because of the phase correlation of the halftone dots in the original separations, the overlap combinations themselves will also be correlated. In FIG. 11C this leads to two sorts of areas. In a first sort of area, most of the cyan and magenta dots fall on top of each other and produce a matrix of cyan and magenta overprinted dots and white spaces. In a second sort of area most of the cyan and magenta dots fall in between each other and produce a matrix of magenta and cyan dots with no or few white spaces present. Both sorts of areas produce a different color since the calorimetric addition of white and cyan on top of magenta dots does not yield exactly the same color as the calorimetric addition of cyan and magenta dots. The net result is that the color balance is not stable across the printed reproduction and that the print will appear blotchy.

When the registration between the two separation changes as in FIG. 11D, for example due to some mechanical instability of the printer or the substrate, the areas of the first kind may turn into areas of the second kind and vice versa. So not only is the color balance unstable across the print, it also varies with the registration of the printer and becomes unpredictable in the presence of misregistration. As both FIG. 11C and FIG. 11D show, the correlated artifacts in the individual separations can give yield to low frequency patterns that were not present in any of the original separations and that change as a function of the registration between the original separations.

What the above explanation shows is that correlation of the halftone dot positions can result in low frequency graininess and patterning, and in locally unstable color balance in the presence of misregistration.

The existing art uses the introduction of a random element such as the perturbation of weights or the addition of noise to the threshold in error diffusion to break up the phase correlated dot positions, but this—as was mentioned before—also introduces graininess in the halftoned image.

It is an objective of the invention to control the correlation between halftone dot distributions of the different printing masters without the introduction of graininess.

The graininess that is visible in images rendered with frequency modulation halftoning techniques is highly related to the power distribution in the two dimensional Fourier spectrum. Because the human visual system acts as a low pass filter, it is the presence of energy in the lower frequency part of the spectrum that is mostly responsible for the graininess. By filtering the power spectrum of digital halftone with the "contrast sensitivity function" of the human visual system, a measure is obtained for the amount of visible graininess. With color printing the situation becomes more complicated, as there are not one but three sensitivity functions that have to be considered, each one corresponding with one of the three sensors of the human visual system. Two articles are worth mentioning in that regard: a first one is on "The visibility of patterns in halftone images" by Huw C. Owens and Stephen Westland (Colour and Imaging Institute, Derby University, UK), and a second one is called "Contrast sensitivity for lime-cyan and purple orange gratings" by Huw C. Owens and Stephen Westland (of the Colour and Imaging Institute, Derby University, UK) Koen Vande Velde, Paul Delabastita, Juergen Jung (all of Agfa-Gevaert N. V.). Both articles were presented at the 10$^{th}$ conference on color imaging conference organized by the IS&T in Scottsdale. The quantitative data that is presented in this article indicates that the contrast sensitivity function (CSF) in the luminance channel of the human visual system is significantly higher than that of the in the two the channel that detects the red-green contrast and the channel that detects the yellow blue contrast. It would be advantageous to incorporate this characteristic of the human visual system when designing a digital halftoning technique for color printing.

It is the primary object of the invention to create printing masters that result in images with reduced graininess in the luminance channel of the human visual system.

The standard algorithms for error diffusion or masked based frequency modulation often result in inferior image quality. They do not take into account the special properties of the modern inkjet printing systems.

Hitherto no system exists for CtP using an inkjet printing system with a specially adapted halftoning algorithm to obtain optimum results.

SUMMARY OF THE INVENTION

The above-mentioned advantageous effects are realised by a method having the specific features set out in claim 1. Specific features for preferred embodiments of the invention are set out in the dependent claims.

Further advantages and embodiments of the present invention will become apparent from the following description and drawings.

DETAILED DESCRIPTION OF THE INVENTION

While the present invention will hereinafter be described in connection with preferred embodiments thereof, it will be understood that it is not intended to limit the invention to those embodiments.

The above mentioned problems can be partially solved by the system and method wherein printing masters are generated using an inkjet printing system while combining them with a constraint correlation error diffusion algorithm which will be described hereinafter.

Figure 1:
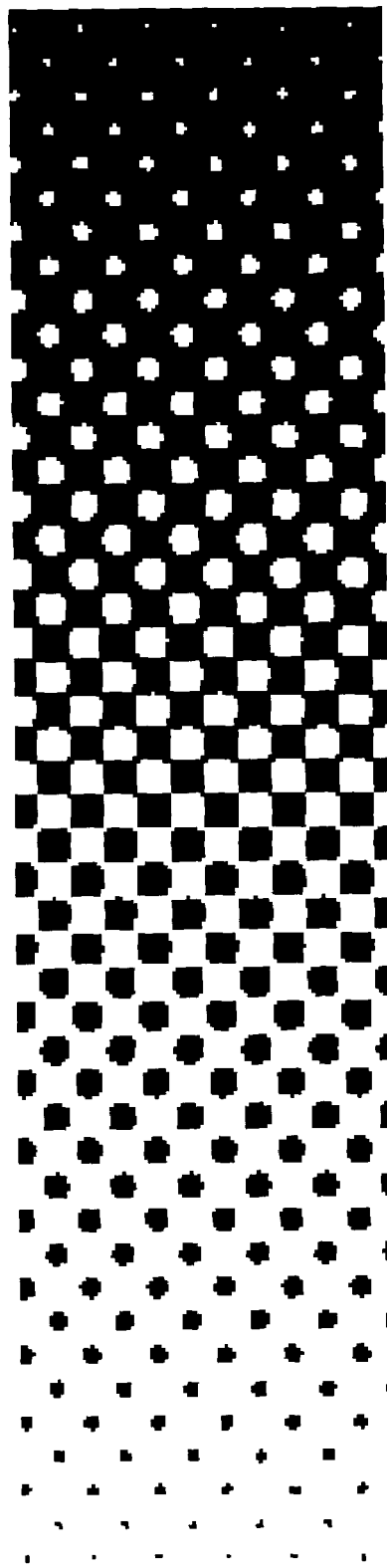
FIG. 1 shows a degrade represented by halftoning using AM screening.
Figure 2:
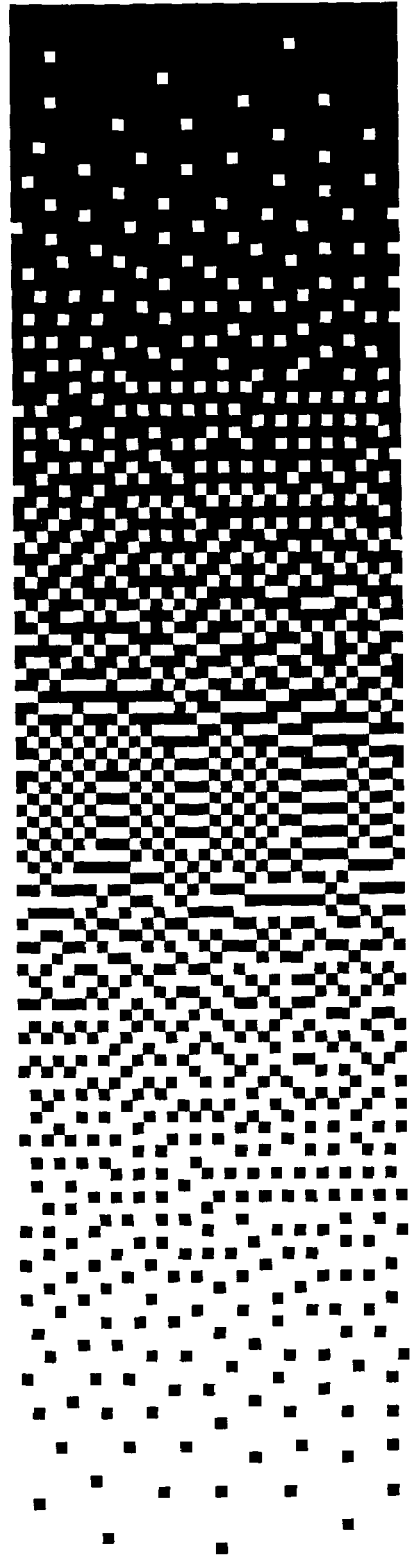
FIG. 2 shows a degrade represented by halftoning using FM screening
Figure 3:
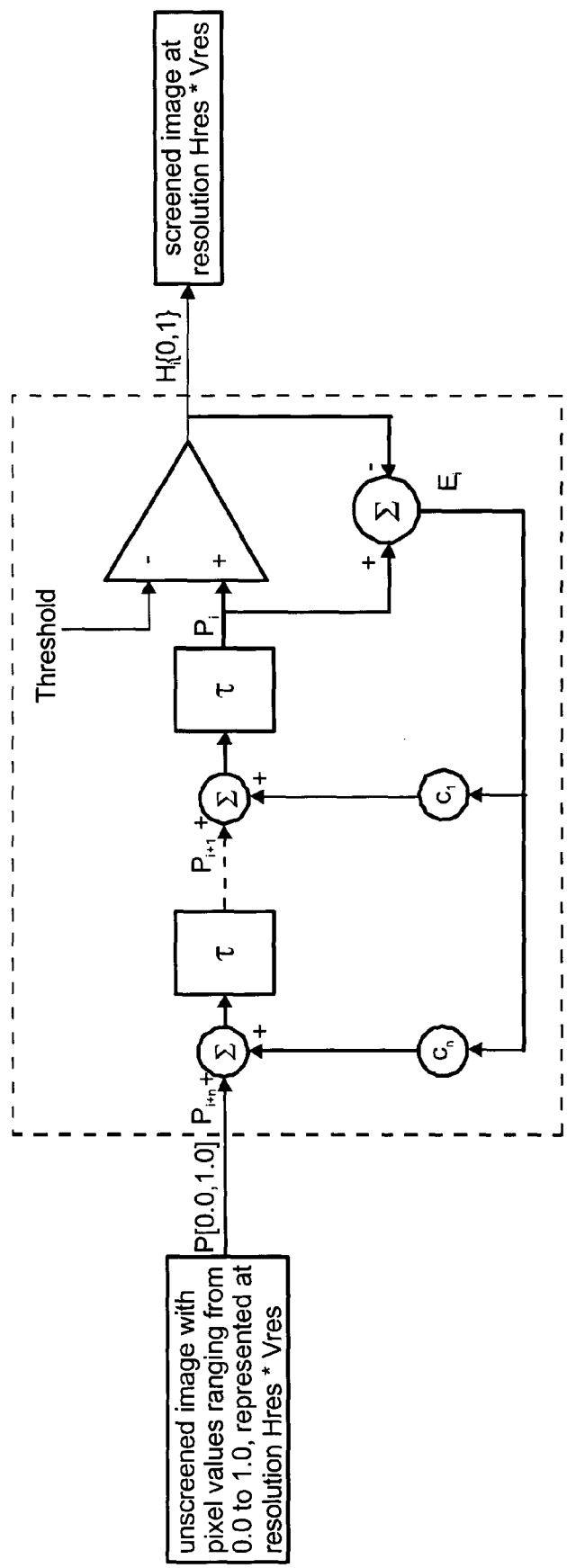
FIG. 3 gives the basic working diagram of error diffusion halftoning.
Figure 4:
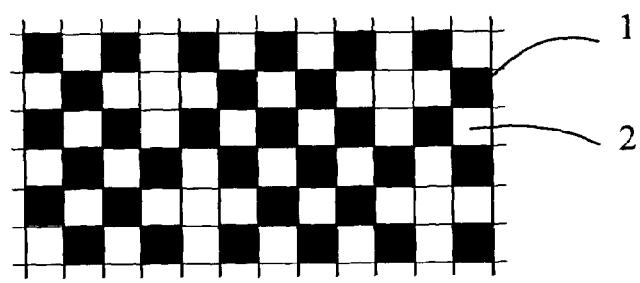
FIG. 4 shows the correspondence of dot size and grid resolution in standard FM halftoning.
Figure 5:
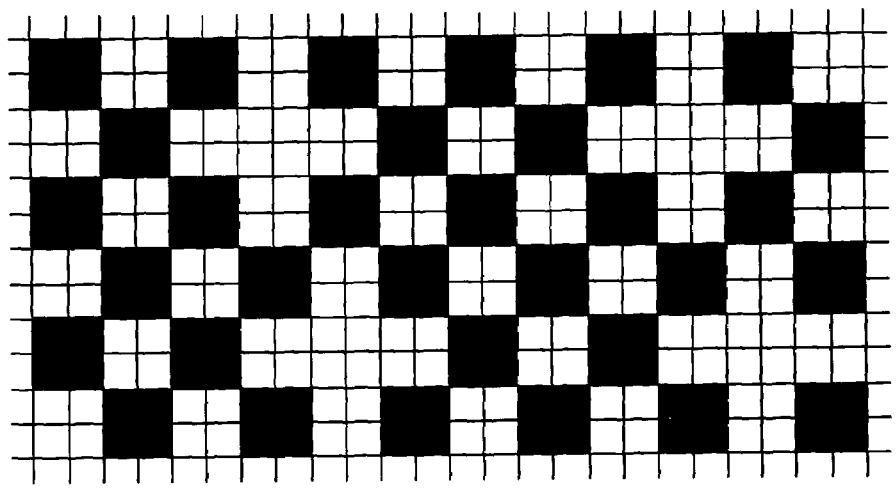
FIG. 5 illustrates the use of pixel replication to obtain larger dots.
Figure 7:
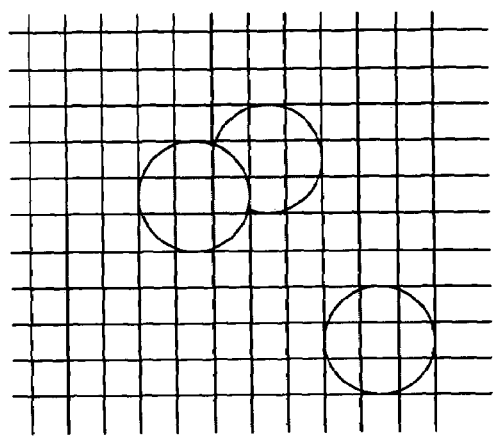
FIG. 7 illustrates the relation of recording grid and printed dots in inkjet recording.
Figure 6:
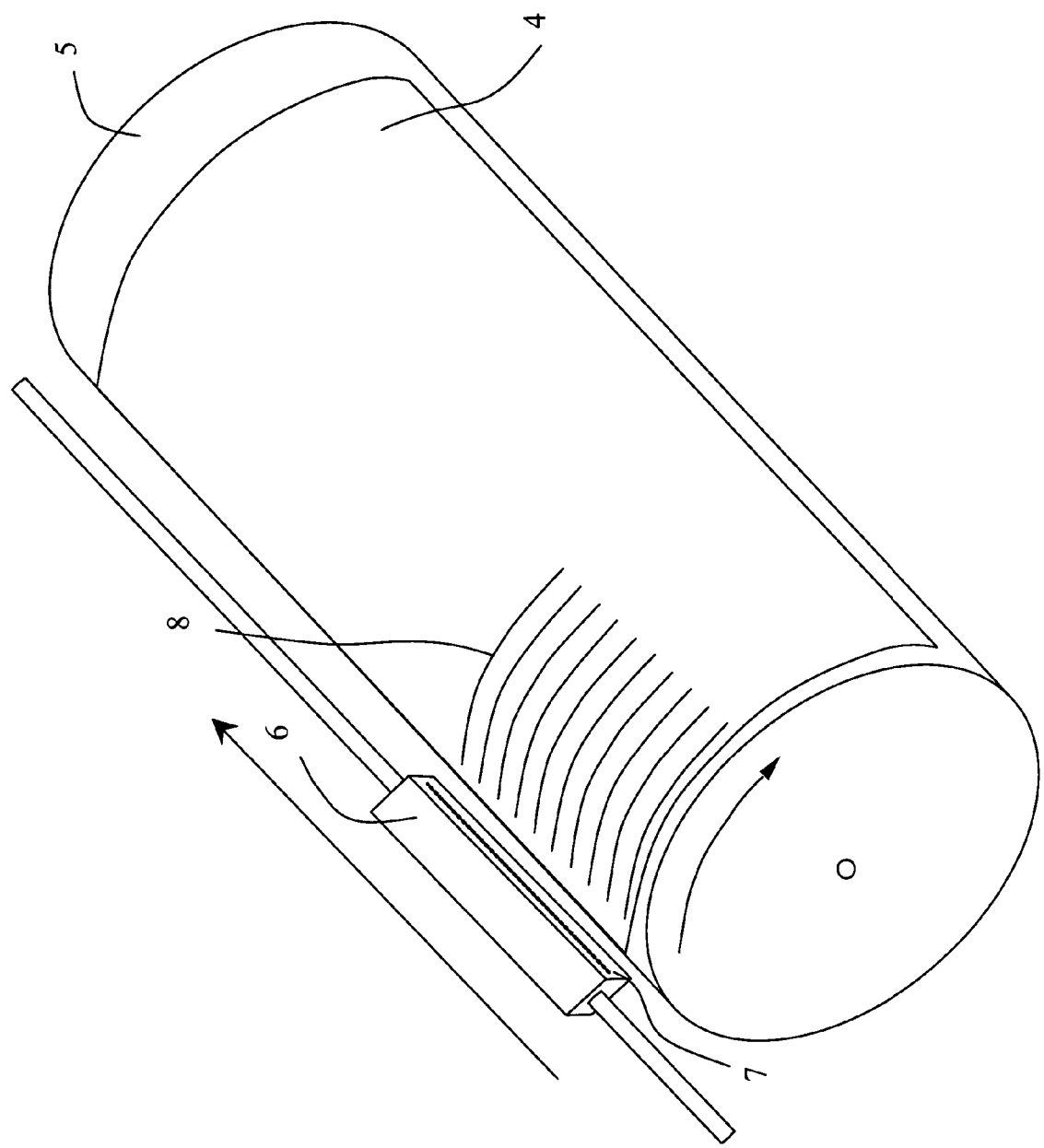
FIG. 6 depicts an inkjet recorder with the different components.
Figure 8:
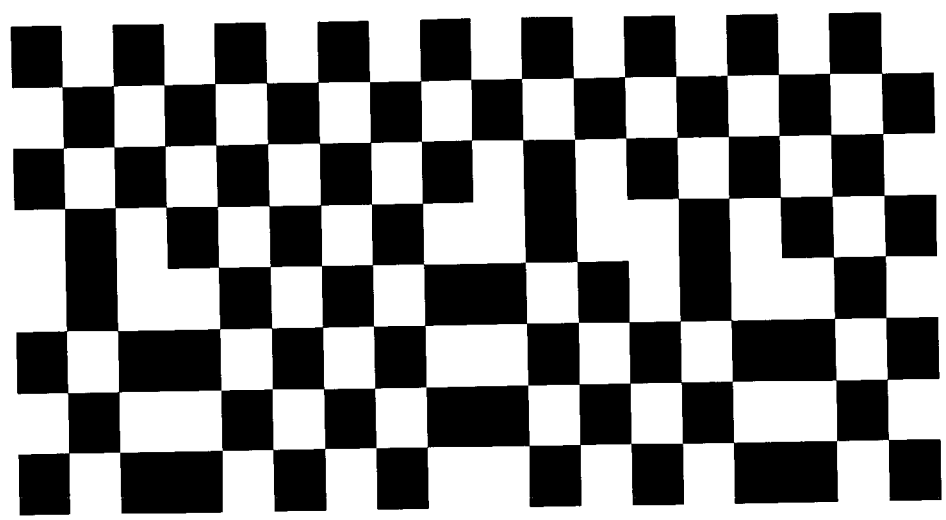
FIG. 8 gives an example of a tone value of 128/255 rendered by means of Floyd and Steinberg error diffusion.
Figure 9:
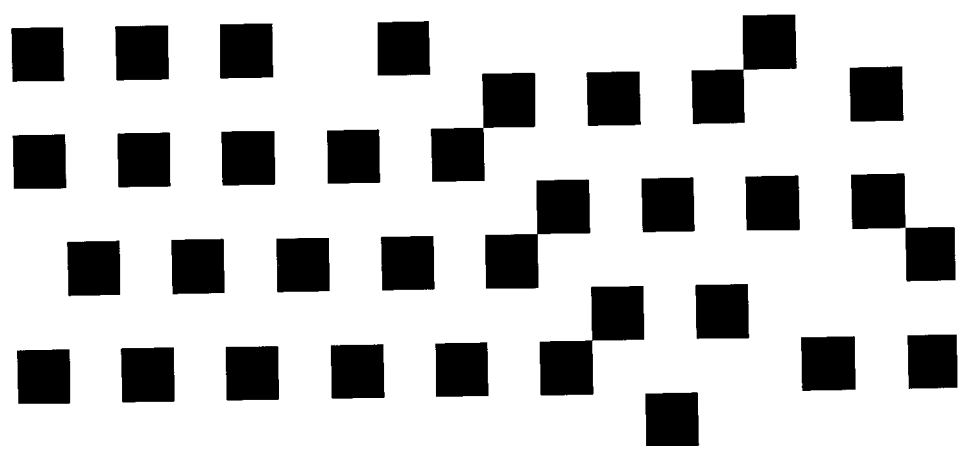
FIG. 9 shows the rendering of a 192/255 tonal value using the Floyd and Steinberg process.
Figure 10:
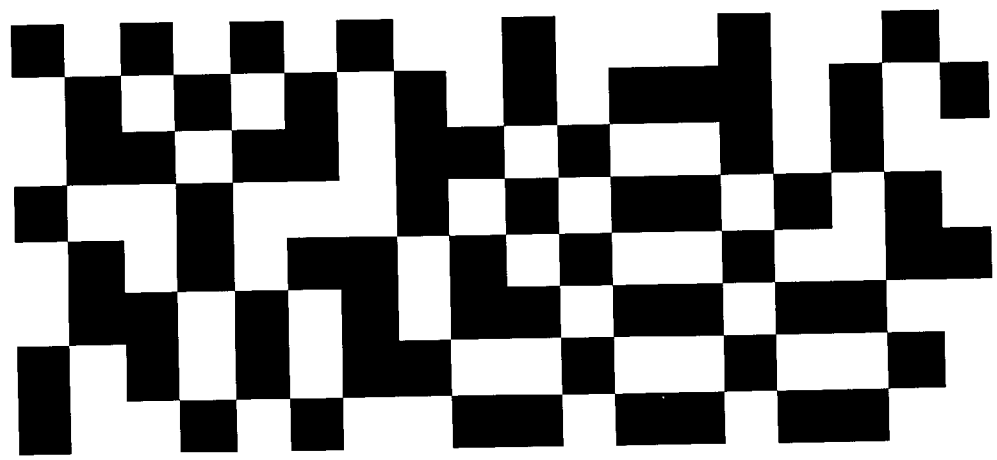
FIG. 10 gives the rendering of a 128/256 tonal value using the improved method according to Ulichney.
Figure 11A:
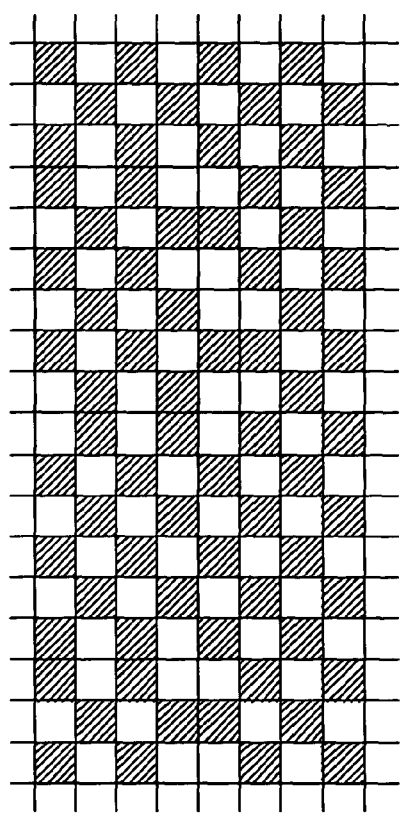
FIG. 11A gives the rendering of a value of 128/256 for the cyan ink
Figure 11B:
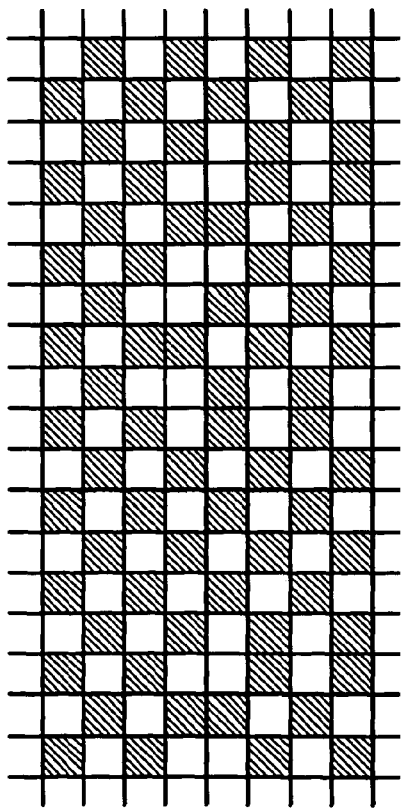
FIG. 11B gives the rendering of a value of 128/256 for the magenta ink
Figure 11C:
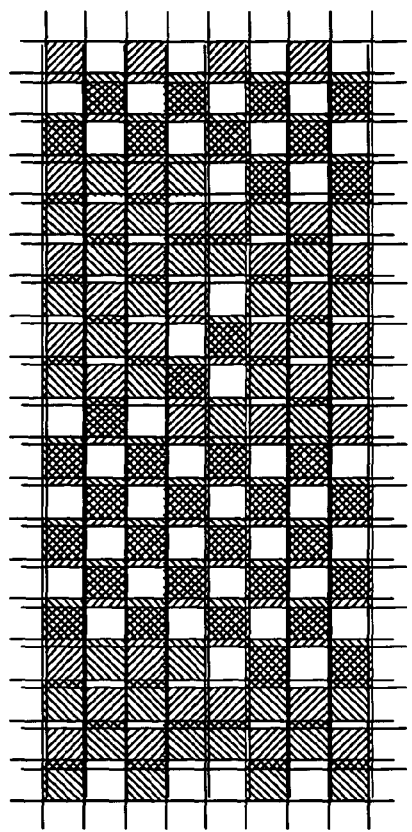
FIG. 11C shows the result of the overprint of 11A and 11B in perfect register.
Figure 11D:
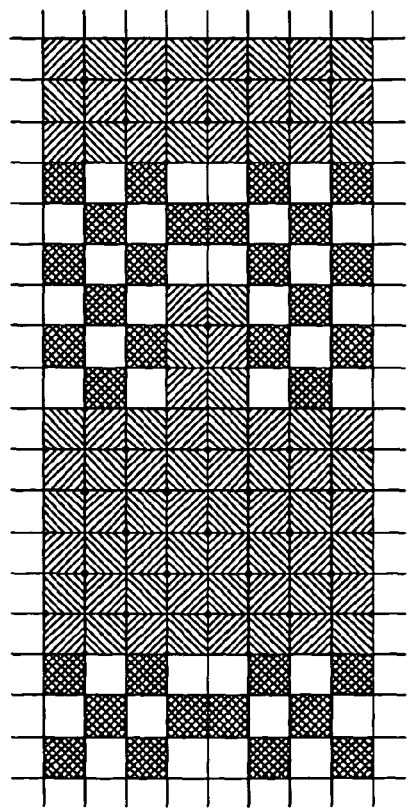
FIG. 11D shows the result of the overprint of 11A and 11B having register defects.
Figure 12:
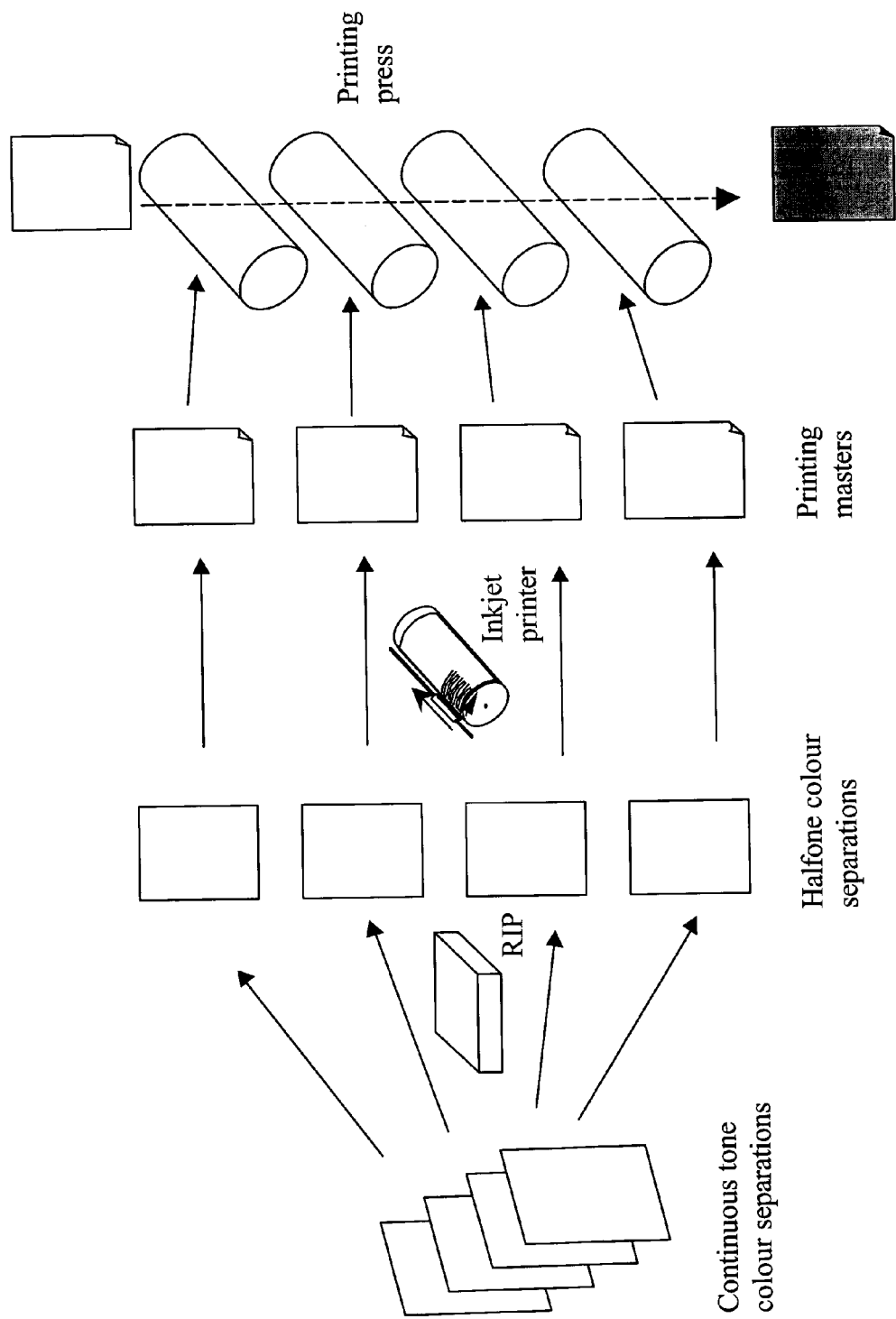
FIG. 12 shows the workflow in a 4 colour computer to plate system using inkjet printing systems to make the printing masters.

FIG. 12 illustrates a possible workflow in colour printing systems.

- the information of the input colour image is given by four continuous tone colour separations. These contain the input pixel values of the spatially corresponding component pixels of the different colour separations and represent an input colour pixel of the input colour image.
- by using the halftoning algorithm in the raster image processor (RIP) for each printing colour a halftone image is obtained.
- each halftone representation is transferred to a printing plate precursor by an inkjet printer to obtain a set of four printing masters.
- the final image is reproduced using the four printing masters on a printing press.

Each input colour pixel is thus represented by a combination of output colour pixels. As described above due to the halftoning process an exact match of the colour and brightness is not always possible. Due to the error diffusion process, deviations are distributed to the surrounding pixels as the error in the error diffusion process. Certain combinations of output colour pixels may however lead to unstable reproduction of the image input pixel which can give differences in overall brightness and or colour.

It was observed that when comparing the contrast sensitivity curves measured from monochrome gratings with those of coloured gratings, it is immediately clear that high-frequency errors in the luminance channel are more noticeable than those in the chrominance channels. This implies that isolated dots will be far more noticeable when they differ in luminance with their background than when they differ in chrominance and have a similar luminance.

By including a further rules in the halftoning algorithm placing a restriction upon the possible correlation of different halftone dots in the different output colour separations, these effects can be avoided and even better image reproduction can be obtained. Interactions between different colours is kept under control.

In following example the overall brightness is especially guarded. Certain output colour pixel combinations are avoided.

Consider an colour image forming process using k different inks or primaries wherein each ink $I_k$ has $N_k$ possible density levels. Thus $I_1$ has $N_1$ possible levels, $I_2$ has $N_2$ possible levels, . . .

For this printing process with k primaries $I_1, \ldots, I_k$, having $N_1, \ldots, N_k$ intensity levels respectively, an embodiment according to the present invention can be described as follows:

The input image is determined by the input colour component values.

A scalar value is determined wherein the scalar value is at least a function of one of said input pixel values of said spatially corresponding component pixels;

First a scalar value, in this case the brightness level, is determined.

The Brightness $B=(N_1-1-I_1)+(N_2-1-I_2)+ \ldots +(N_k-1-I_k)$.

The scalar value B is quantized using a multilevel halftoning process. The number of quantization levels for B is preferably $M=1+(N_1-1)+(N_2-1)+ \ldots +(N_k-1)$ but will generally be situated in the range $k-N_1+N_2+ \ldots +N_k$. Even more preferably the allowed quantized B-value for an output pixel is restricted to be the one just above or below or on the original B-value of the input pixel.

A separate error diffusion process applied to the B-value is an M-level error diffusion process, operating independently from the colour error diffusion. The outcome of the Brightness-error diffusion is used to guide the colour-error diffusion This guiding is done by selecting a set of intensity-level combinations which is a subset of the complete set of all possible intensity-level combinations.

For $B=i$, $0 \leq i \leq (N_1-1)+(N_2-1)+ \ldots +(N_k-1)$, the level set Bi contains all possible combinations yielding $B=i$.

Figure 13:
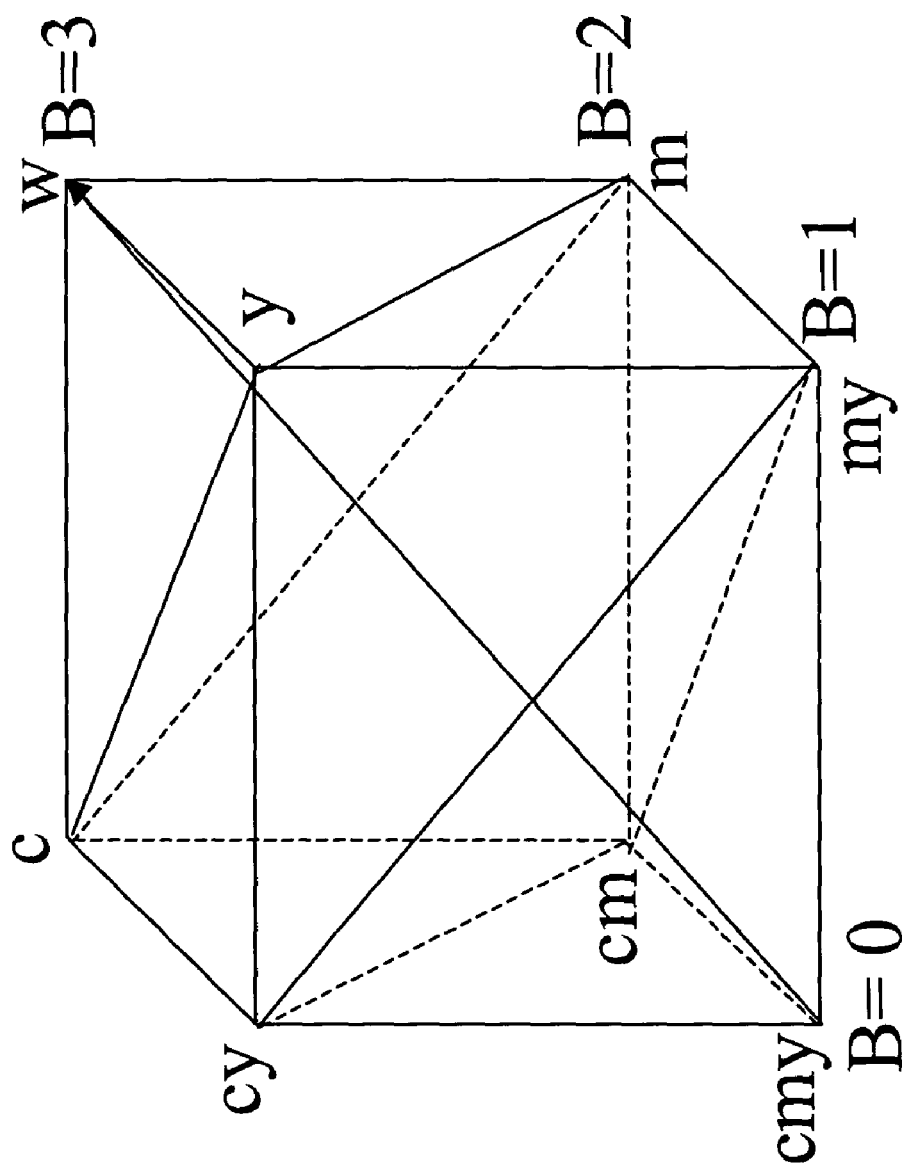
FIG. 13 depicts a sub-hypercube of a three colour system containing $2^3$ points

To reduce the number of computations as well as to improve the quality of the halftoning, the quantization colour of an output pixel is restricted by an extra output colour restriction to be one of the colours situated on the corners of the sub-hypercube in which the original colour of the input pixel is situated. Each k-dimensional sub-hypercube contains $2^k$ points. A representation of such a sub-hypercube for a three colour system is given in FIG. 13

The intersection of this set of $2^k$ points with the set of points having a B-level equal to the quantized B-level that is obtained in the B-error diffusion process is non-void. The quantization colour is preferably determined to be the point in this intersection that is closest to the modified pixel colour in the k-dimensional colour space. The modified pixel colour is equal to the original input pixel colour+colour errors received from previously processed pixels. The error to be diffused is the difference between the modified pixel colour and the quantized pixel colour. This difference is calculated in each of the colour channels separately.

In this example due to the constraint correlation method disturbing brightness deviations are avoided.

More generally the constraint correlation method for a computer to plate system using an inkjet system can be described as follows:

A method for creating at K printing masters for reproducing an electronic image having colour pixels, each colour pixel being represented by K spatially corresponding component pixels, K>1, each component pixel having an input pixel value, the output device being capable of rendering Nj intensity levels for a component pixel j, $1 \leq j \leq K$, thereby defining N1 * N2 * . . . * NK intensity level combinations, the method comprising the steps of:

computing for any colour pixel a scalar value which is a function of at least one of said input pixel values of said spatially corresponding component pixels;

quantizing said scalar value by a multilevel halftoning process to obtain for said colour pixel a quantized scalar value;

using said quantized scalar value to select, out of all said intensity level combinations, a subset of intensity level combinations;

selecting one combination out of said subset;

using said selected combination for creating K printing masters by:

providing K printing master precursors, selectively creating ink carrying and non-ink carrying areas on said printing master precursors according to the selected combination by means of an inkjet printing system printing inkjet dots on the printing master precursor.

Using the constraint correlation description of above, it is possible to avoid certain combinations of output ink values leading to undesirable or less desirable results regarding e.g. Brightness (ink coverage), colour stability, etc . . . which can result of overlap of the ink dots for the different colour printing masters, Preferably also variability in printing press properties are included in setting the rules to constraint colour dot correlation.

In modern printing systems the printing masters are preferably planographic printing masters. These can be made using an inkjet printing system wherein the printed inkjet dots generate hydrophobic and hydrophilic areas on the printing master precursor. The planographic printing system normally is a printing system having only two possible intensity levels, but when using e.g. light cyan and/or light magenta ink, the number of intensity levels N for magenta and/or cyan can be considered as to be more than two i.e. no ink, light magenta, full magenta. The same consideration can be made when using light cyan or gray ink when reproducing an image.

Another aspect is however that a problem remains in halftoning due tot the size of the printed inkjet dots which is larger than the pixel size. Preferably this has also to be taken into account. This can be done in the step wherein from the subset of intensity level combinations one combination is chosen.

Preferably this is done by combining the constrain correlation method with a sub-dot phase modulation error diffusion algorithm which has the advantage that the characteristics of the ideal frequency modulation technique are approximated by making use of the high addressability of the recording system that is not infinite but that is substantially higher that the size of the halftone dots in the inkjet printing system.

By allowing the distance between the halftone dots to be modulated in much smaller increments than the size of the halftone dots themselves, a frequency modulation halftoning system is obtained that offers advantages in suppressing artifacts near rational tonal values. We call this principle "sub-dot phase modulation". Since with sub-dot phase modulation the position of the halftone dots is controlled with a precision that exceeds the size of the halftone dot, the relative distance between the halftone dots can also be controlled with much greater accuracy than in standard frequency modulation.

A printing method having the specific features is able to modulate the distance between the halftone dots by taking into account the effect of density value changes caused in an area in the output image by placement of the large inkjet dot.

The combination of the constraint correlation method with a sub-dot phase modulation method in inkjet printing has the advantage that the error diffusion algorithm can be adjusted in function of the properties of the recording system.

A description of the sub dot phase modulation method follows hereinbelow.

We define an error diffusion process as follows:

A method for converting an image consisting of unprocessed input pixels having n1 possible values representing optical densities into an output image represented by processed pixels having n2 possible values representing optical densities, where 1<n2<n1. The processing of a pixel comprises:

a quantization step in which the value of a processed pixel is determined from the value of a modified pixel;

an error value calculation step in which the difference between the modified and the processed pixel is determined;

an error diffusion step in which at least one unprocessed pixel is modified by at least a portion of the quantization error value.

Standard Error Diffusion

Figure 14A:
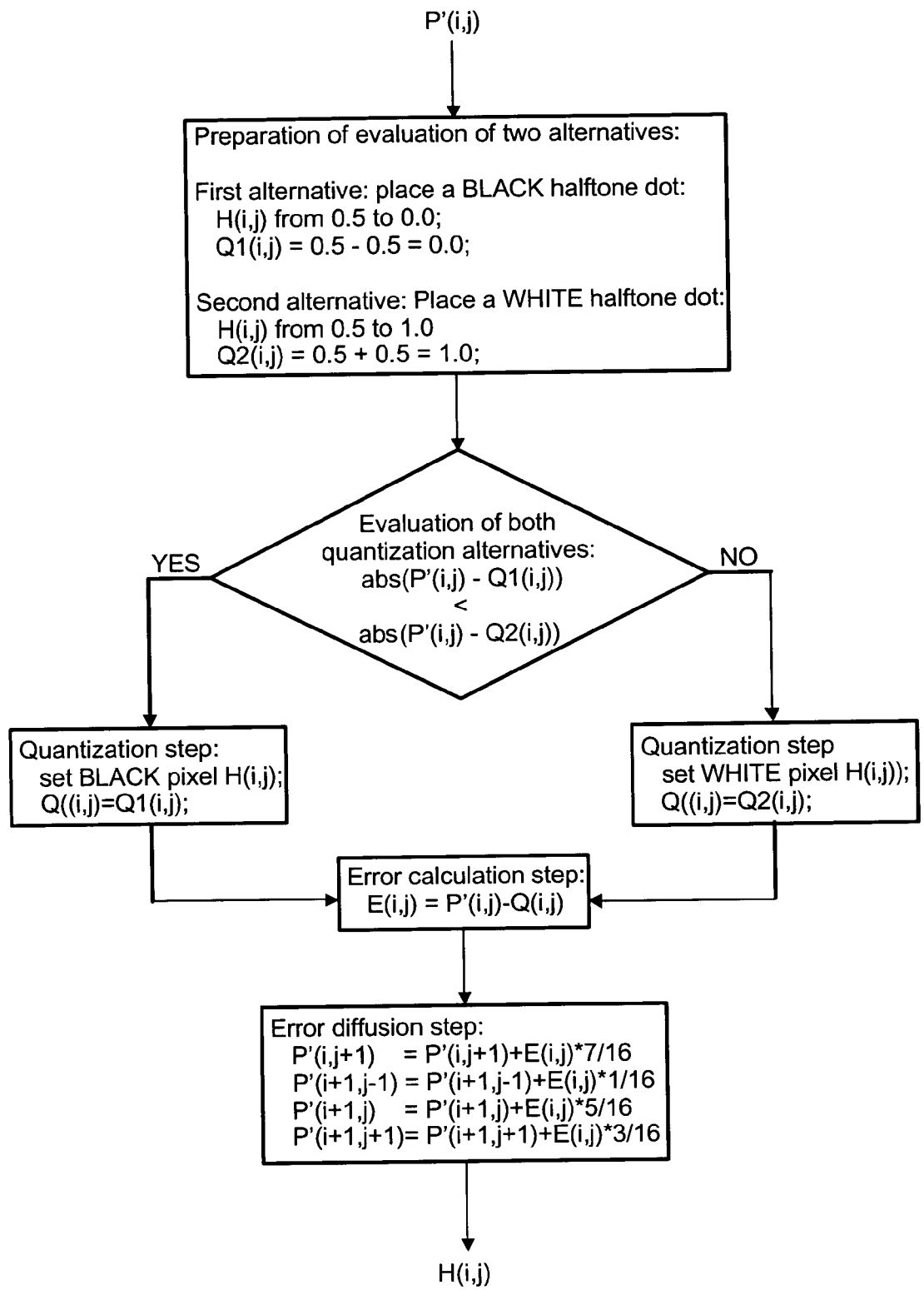
FIG. 14A shows a less conventional description of the standard error diffusion process.
Figure 14B:
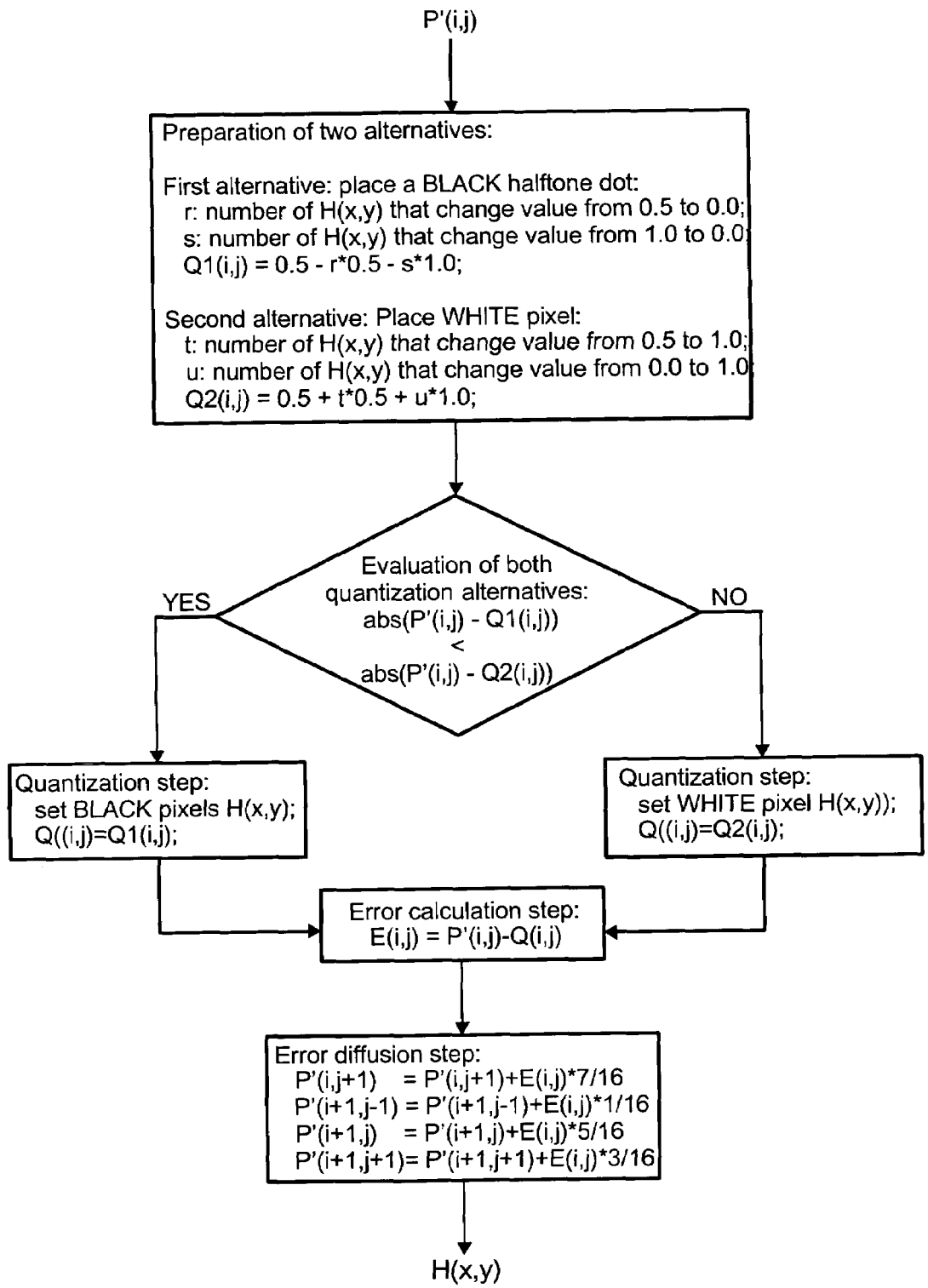
FIG. 14B shows a less conventional description of the error diffusion process according to the invention.

Before explaining in detail a method according to the invention, we start by presenting the standard error diffusion process from a slightly unconventional perspective by way of reference. Illustration is given in FIG. 14A.

In what follows, we take on the convention that the origin (0,0) of the image corresponds with the top left corner, that the value 0.0 represents "black", while 1.0 represents "white".

Placing a halftone dot means printing a black spot on a white canvas.

We define $P(x,y)$ as the input pixels or input pixel value of the original image, $P'(x,y)$ as the modified pixels of the original image modified with a contribution of the error made on previous processed pixels obtaining a modified pixel value, and $H(x,y)$ as the pixels of the halftoned output image. The error diffusion process will transform every input pixel $P(x,y)$ into a halftone output pixel $H(x,y)$.

Before the processing starts, the output pixel values of the halftoned image are all preset to 0.5. According to the approach, the error diffusion process consists of replacing the preset values of $H(x,y)$ by either 0.0 or 1.0 in a way that an optimal halftone rendering is obtained of the original image.

The processing of an image normally is performed line by line, starting at the top of the image. Within a line, the processing takes place from left to right, or from right to left, or—preferably—alternating between these two directions as suggested by Robert Ulichney in U.S. Pat. No. 4,955,065. The latter approach is called "serpentine scan".

The processing of a pixel $P'(i,j)$ at position $(i,j)$ consists of the following steps that are also represented in FIG. 19.

1) Determining a quantization set consisting of the two possible quantization values $Q_1(i,j)$ and $Q_2(i,j)$ that correspond to the available distinct cases of:

a. Converting the gray pixel $H(i,j)$ into a black pixel by decreasing the preset halftone value $H(i,j)$ from 0.5 to 0.0; The quantised value $Q_1(i,j)$ in that case is 0.0;

b. Converting the gray pixel $H(i,j)$ into a white pixel by increasing its value from 0.5 to 1.0. The quantised value $Q_2(i,j)$ in that case is 1.0.

2) If $Q_1(i,j)$ is closer to $P'(i,j)$ then $H(i,j)$ is set to 0.0 and $Q(i,j)=Q_1(i,j)$ else $H(i,j)$ is set to 1.0 and $Q(i,j)=Q_2(i,j)$.

Using this criteria a selection is made of a quantization value out of the quantization set based upon the modified pixel value 3) Calculating the error value E(i,j) as the difference between the P'(i,j)−Q(i,j).
4) Modifying one or more of the unprocessed input pixels P(i,j) of the original image by adding to their value a fraction of the error E(i,j) in a way that the fractions add up to 1.0, for example using the "Floyd and Steinberg" error diffusion weights.

The modification of the error diffusion scheme for choosing one of the combinations of the subset according to our invention consists of:

a quantization step in which the value of the pixels forming a cluster, covered by the inkjet dot, are determined from the value of a modified pixel.

an error calculation step in which the difference between the modified and the processed pixels is determined;

an error diffusion step in which at least one unprocessed pixel is modified by at least a portion of the quantization error value.

During the quantization step immediately a group of nxm processed pixels, corresponding to the halftone inkjet dot is determined. However, because the error diffusion is still performed at the full resolution of the recording device, the phase (or position) of the halftone dots is controlled at the full resolution of the recording device.

Error Diffusion with Sub-Dot Phase Modulation for an Inkjet Printing System

General Embodiment

Using the previous explanation of the standard error diffusion as a basis, we will now explain a first possible embodiment of the invention.

Just like in standard error diffusion, the processing of an image consists of processing the image line-by-line and pixel-by-pixel. The ordering of the pixel processing within a line can be from left to right, from right to left or—preferably—according to a serpentine scan.

One distinguishing characteristic of the new method is that during the "quantization step" at a position (i,j) not just the value of pixel H(i,j) can be altered, but rather the values of a cluster of adjacent pixels H(x,y) around the position (i,j). Such a cluster can consist of the pixels influenced by the placed inkjet dot.

According to the method according to the invention, a quantization set containing the quantization values of the two alternatives—placing a cluster of dark or of light pixels—are evaluated, taking into account density value change upon an area of the inkjet dot corresponding to more than one pixel in the output image and the overlap of the dot with clusters of pixels that were placed by printing a dot in a prior image-processing step. The one alternative quantization that most closely approximates the modified pixel value P'(i,j) is selected, the appropriate quantization error is calculated, taking into account inkjet dot overlap, and this error value is distributed to at least one other input pixel.

It is specifically mentioned, that in the decision process of selecting one of the two alternatives—printing a dot or defining a cluster of light pixels—not just the density value change in the output image of the area coinciding with the processed pixel is taken into account, but also the surrounding area affected by printing the inkjet dot.

The cluster of black pixels is determined by the placement of the halftone dot. The alternative choice is normally the definition of a single white pixel, i.e. the cluster has only a single pixel, however the algorithm can include the definition of plural white pixels.

Using the notations, symbols and conventions in the previous explanation of standard error diffusion, the invention can now be generically described by the following sequence of operations that are also summarized in FIG. 12B.

The process of halftoning at the input pixel position P'(i,j) consists of the following steps:

1) Determining the two possible quantised values $Q_1(i,j)$ and $Q_2(i,j)$ of the quantization set, that correspond to the distinct available cases of:
   a. Placing a cluster of black pixels (determined by the inkjet dot); the quantised value $Q_1(i,j)$ in that case corresponds to 0.5−r*0.5−s*1.0, in which "r" corresponds to the number of positions that are converted from 0.5 to 0.0 and "s" to the number of pixels that are turned from white (1.0) to 0.0 by placing this cluster of black pixels. It is allowed that a pixel that was made black in a previous step be made black again, but such a pixel is not counted in the determination of "r" to avoid "double counting" of the conversion of pixels from gray to black.
   b. Placing a white pixels, possibly a single white pixel; the quantised value $Q_2(i,j)$ in that case corresponds to 0.5+t*0.5, in which "t" corresponds to the number of positions that are converted from 0.5 to 1.0. It is not allowed that a pixel that was made black in a previous step be made white again.

The density value changes upon the areas in the output image of the two distinct cases is taken into account.

2) Selecting a quantization value. If $Q_1(i,j)$ is closer to P'(i,j) then a cluster of output pixels H(i+x,j+y) around the position (i,j) is set to 0.0 (black) and $Q(i,j)=Q_1(i,j)$; else a cluster of output pixels H(i+x,j+y) is set to 1.0 (white) and $Q(i,j)=Q_2(i,j)$;
3) Calculating the error E(i,j) as the difference between the P'(i,j)−Q(i,j).
4) Modifying one or more of the unprocessed input pixels P(i,j) of the original image by adding a fraction of the error value E(i,j) to their value in a way that the fractions add up to 1.0.

A first observation is that the new method of error diffusion adapts for the generation of halftone inkjet dots that are substantially larger than one pixel of the addressable grid of the recording device.

It is also clear that the position of the halftone inkjet dots in the new method are controlled by an increment that is substantially smaller than the size of the halftone inkjet dots, it allows for the halftone dots to be placed at any arbitrary position of the pixel grid. The improved control over the phase of the halftone dots enables to achieve our objective to suppress the spatial rounding off effects that otherwise are the cause of disturbing artifacts near rational tone values—and this without the injection of noise into the algorithm.

Since with sub-dot phase modulation many more positions are available for the halftone dots within a single separation, more control is also available to avoid problems related to relative positions of the halftone dots in different separations in color printing.

Even in case that the dot positions would tend to be phase correlated, this correlation can be broken up with the introduction of a smaller amount of randomness into the algorithm than without sub-dot phase modulation.

These observations support the statement that for color printing applications with frequency modulation halftoning, the new method improves the stability and predictability of the color balance and avoids the occurrence of low frequency artifacts, without introducing an objectionable amount of graininess into the image.

The placement of white and black clusters can however be restricted by further rules, possible defined by the recording system. This means that not all distinct cases of placing the clusters are possible or available. Not all quantization values are to be calculated.

EXAMPLE

Specific Embodiment: "White" Clusters having a Size of One Pixel and Black Halftone Inkjet Dots Cover a Cluster of 3×3 Pixels In a typical and representative embodiment, the black cluster of pixels is assumed to be a 3×3 cluster defined by the minimum halftone inkjet dot and they can overprint each other or white space, while the white "clusters" consist of only one pixel and can never overprint a black pixel.

The inkjet printing system transferring the halftoned colour separated images to the printing masters has certain characteristics The resolution of the grid on which the halftone dots can be placed is 110 pixels/mm (2750 pixels/inch)

the volume of the small droplets deposited on the printing plate precursor are about 4 pl resulting in a dot size of 30 μm diameter.

As shown in FIG. 13A, this means that when placing the smallest dot on the recording grid, an area of about 9 pixels is covered by the ink. This is the case when placing a dot D1 on position p1 shown on the left. Thus placing a single dot at a location within this system causes a density change over a larger area. Normally an area of 9 pixels will be covered. When however, as shown on the right the dot D2 at position p2 overlaps with a pre-existing dot Dp, the influence on the surroundings will be smaller as less dots change from grey to black.

FIG. 13B indicates that not placing a dot has no influence on the surroundings and is only important for the grid location concerned.

In inkjet printing the halftone dot is referenced by the center pixel (i,j) and placing a halftone dot at position (i,j) will cause the pixel values $H(i+x,j+y)$ with $-1 \leq x < 1$ and $-1 \leq y <$ to go to 0.0 (black). This is also the case when the processing takes place from left to right.

The processing of a modified pixel $P'(i,j)$ than consists of the following steps:
1) Determining the quantization set of two possible (available) quantised values $Q_1(i,j)$ and $Q_2(i,j)$, that correspond to the distinct cases of:
   a. Placing a black halftone dot; the quantised value $Q_1(i,j)$ in that case corresponds to 0.5−f*0.5, in which f corresponds to the (maximum 9) positions that are converted from 0.5 to 0.0 by placing the halftone dot. The positions that already were at a value of 0.0 as a result of a previous processing step are not counted in the determination of $Q_1(i,j)$ to avoid "double counting" of the conversion of pixels from gray to black.
   b. Placing a white pixel. Depending on the value of H(i,j), two cases are to be distinguished:
      i. Either H(i,j) was still at the preset value of 0.5; in that case H(i,j) is converted from 0.5 to 1.0 to become a white (1.0) pixel, and $Q_2(i,j)$ becomes 1.0 (white) to reflect the conversion of that pixel from gray to white.
      ii. Or H(i,j) was previously set to 0.0 as a result of the placement of a black halftone dot in a previous processing step. Since a black pixel cannot be turned into a white pixel again, the value of H(i,j) remains at 0.0 and $Q_2(i,j)$ is set to 0.5, to reflect the fact that value at H(i,j) at position (i,j) was left unaltered in processing the pixel at position (i,j).
2) If $Q_1(i,j)$ is closer to $P'(i,j)$ then the pixels $H(i+x,j+y)$ of the halftone dot at position (i,j) are all set to 0.0 and $Q(i,j)=Q_1(i,j)$ else $Q(i,j)=Q_2(i,j)$ and H(i,j) can take two values corresponding to the cases (i) or (ii) explained for case 1b.
3) Calculating the error E(i,j) as the difference between the $P'(i,j)−Q(i,j)$.
4) Modifying one or more of the unprocessed pixels $P'(i,j)$ of the original image by adding to them a fraction of the error value E(i,j) in a way that the fractions add up to 1.0.

It is clear that this method enables the exact control of the position of halftone dots consisting of a plurality of pixels on the pixel grid. The dots can be placed at any arbitrary position of the pixel grid to optimally represent the input image to be converted. Density value changes of an area in the output image are taken into account.

Multilevel Embodiments

The above explained standard sub dot phase modulation algorithm can be extended to a multilevel algorithm.

Although in printing there is only the possibility to have ink coverage and no ink deposition. There is a possibility to use multilevel systems. One could imaging a printing system using black and gray ink leading to the possibility of having more than two in levels on the receiving layer, (printed paper). Printing systems do exist using multiple density inks for magenta and cyan. Each image is e.g. printed using Yellow, light Magenta, dark Magenta, Light Cyan, dark Cyan and Black ink.

The light and dark inks will be printed using different printing plates, but the decisions to print a light or dark halftone dot are to be considered at the same time. For each pixel processed there are three possibilities.

Let us assume that the intermediate level has a density value of 0.5.

The process of halftoning at the input pixel position $P'(i,j)$ consists of the following steps:
1) Determining the tree possible quantised values $Q_1(i,j)$, $Q_2(i,j)$ and $Q_3(i,j)$ of the quantization set, that correspond to the distinct available cases of:
   a. Placing a cluster of black (possible dark cyan or dark magenta) pixels, determined by the inkjet halftone dot; the quantised value $Q_1(i,j)$ in that case corresponds to 0.5−r*0.5−s*1.0, in which "r" corresponds to the number of positions that are converted from 0.5 to 0.0 and "s" to the number of pixels that are turned from white (1.0) to 0.0 by placing this cluster of black pixels. It is allowed that a pixel that was made black in a previous step be made black again, but such a pixel is not counted in the determination of "r" to avoid "double counting" of the conversion of pixels from gray to black.
   b. Placing a cluster of gray black (possible light cyan or light magenta) pixels determined by the gray inkjet halftone dot; the quantised value Q2(i,j) in that case corresponds to 0.5−s*0.5, in which "s" corresponds to the number of pixels that are turned from white (1.0) to 0.5 by placing this cluster of gray pixels.
   c. Placing a cluster of white pixels, possibly a single white pixel; the quantised value Q3(i,j) in that case corresponds to 0.5+t*0.5, in which "t" corresponds to the number of positions that are converted from 0.5 to 1.0. It is however not allowed that a pixel that was made black or gray in a previous step be made white again. The density value changes upon the areas in the output image of the tree distinct cases is taken into account.

2) Selecting a quantization value. If $Q_1(i,j)$ is closer to P'(i,j) then a cluster of output pixels H(i+x,j+y) around the position (i,j) is set to 0.0 (black) by printing a black halftone dot and $Q(i,j)=Q_1(i,j)$; If Q2(i,j) is closer to P'(i,j) then a cluster of output pixels H(i+x,j+y) around the position (i,j) is set to 0.5 (gray) and Q(i,j)=Q2(i,j), else a cluster of output pixels H(i+x,j+y) is set to 1.0 (white) and $Q(i,j)=Q_3(i,j)$;

3) Calculating the error E(i,j) as the difference between the P'(i,j)−Q(i,j).

4) Modifying one or more of the unprocessed input pixels P(i,j) of the original image by adding a fraction of the error value E(i,j) to their value in a way that the fractions add up to 1.0.

Even when using a single ink for reproducing a color, it is possible to use a multilevel system. Inkjet systems are usually capable to print more than one dot size. Therefore for each processed input pixel it is possible to make the decision to:

print a large halftone dot.
print a small halftone dot
not to print a halftone dot.

As an example it would be possible to print small halftone dots of 3×3 pixels and to use large halftone dots covering an area of 5×5 pixels. Here also tree quantisation values have to be calculated in order to take a decision.

Example of a Variable Halftone Dot Size Method

In the discussion of the existing art we mentioned already that the choice of an appropriate halftone dot size represents a compromise. It was explained that the graininess in highlight and shadow regions is reduced by printing with smaller halftone dots, while the stability of contrast and color balance in the mid-tones benefits from using a larger halftone dot. We also mentioned that the contours of solid text and graphics preferably are rendered with a halftone dot size of just one pixel.

In what follows we present a variation of the sub-dot phase modulation scheme that enables using a variable dot size for three different tonal ranges, Range1, Range2 and Range3, separated by the values SecondBorderToneValue and FirstBorderToneValue. So the three tonal ranges are:

Range1: [0.0,FirstBorderToneValue]
Range2: [FirstBorderToneValue, SecondBorderToneValue]
Range3: [SecondBorderToneValue,1.0]

Depending upon the position of the border values of the tonal Ranges, the terms Shadowborder and HighlightBorder could be used for the BorderToneValues. More generally stated, the cluster size covered by the inkjet halftone dot can be adjusted depending upon the input pixel value. Possible quantisation levels are restricted based upon input pixel value.

We assume that the size of the halftone dot can alter between two sizes of n by m pixels or q by p, with q>n and p>m. In what follows, we denote the halftone dot size with a size of h by w pixels as hxw, with n<=h<=q and m<=w<=p.

We assume that the halftone dot is referenced by the top left pixel (i,j) if the processing takes place from left to right. What this means is that placing a halftone dot at position (i,j) affects the pixel values H(i+x,j+y) with 0<=x<w and 0<=y<h. If the processing takes place from right to left, the halftone dot is referenced by the top right pixel (i,j). Placing a halftone dot at position (i,j) affects the pixel values H(i+x,j+y) with −w<x<=0 en 0<=y<h.

For driving the printer the pixel serving as gravity center is put into the dot location map.

Using the notations, symbols and conventions in the previous explanation, the third embodiment of the invention can now be described as the following sequence of operations:

The processing of a halftone dot at the pixel position (i,j) consists of the following steps:

1. Determining the halftone dot size, as a function of the unmodified pixel value P(i,j):
   a. If (P(i,j)<FirstBorderToneValue) than (halftone dot size (h,w) will be h=q and w=p)
   b. If (SecondBorderToneValue>=P(i,j)>=FirstBorderToneValue) than (halftone dot size changes proportionally from h=q, w=p at FirstBorderToneValue, till h=n, w=m at SecondBorderToneValue)
   c. If (P(i,j)>SecondBorderToneValue) than (halftone dot size (h,w) will be h=n and w=m)

2. Determining the two possible quantized values $Q_1(i,j)$ and $Q_2(i,j)$, that correspond to the distinct cases of placing a halftone dot or not, calculating the error and modifying the unprocessed pixels with an amount of the error is exactly the same as described above in the case without variable dot size.

Even though the above example has been given for a tonal range subdivided into three sub-ranges, it should obvious to anyone skilled in the art that the same principles can be used for subdividing the tonal range into any number of sub-ranges. In yet another embodiment, the transition from one halftone dot size to another one does not occur at a fixed tonal value, but rather is spread out over a range of tonal values. This effect is for example obtained by determining the decision of the halftone dot size on the sum of P(i,j) and a small random number. The addition of a random number causes the transition from one dot size to another to occur randomly at a slightly higher or lower tonal values, yielding the desired effect of spreading out the transition from one halftone dot size to another one over a range of tonal values.

It is also possible to include a halftone dot distribution alteration step in low and high intensity image regions. The above embodiment can also be used to render solid text and line art with a cluster size of one pixel, so that their contours are rendered at full resolution. This can be done by setting the output value of the pixel to the corresponding minimum or maximum output value if the input pixel value is the minimum or maximum possible input value.

Yet another variation of the above embodiment uses halftone dots consisting of fewer pixels for the rendering of image areas containing a high degree of local contrast, such as textures or object boundaries than for image areas containing a low degree of local contrast.

For this to happen, an unmodified pixel is categorized as belonging to an area containing low local contrast, medium local contrast or high local contrast. Depending on to which category the pixel belongs, a large medium or small halftone dot size is produced. Categorizing the amount of local contrast is based on measuring the variation of unmodified pixel values in an area around the unmodified pixel P(i,j). A simplified approach simply uses the difference between the smallest and largest unmodified pixel value in the area around an unmodified pixel P(i,j). More sophisticated methods that rely on an analysis of the histogram of local neighborhoods are possible to quantify the degree of local contrast and to control the local halftone dot size.

The constraint correlation method can thus be combined with the different sub-dot phase modulation methods to obtain a optimal halftone reproduction with minimum graininess and luminance variations.

Having described in detail preferred embodiments of the current invention, it will now be apparent to those skilled in the art that numerous modifications can be made therein without departing from the scope of the invention as defined in the appending claims.

The invention claimed is:

1. A method for creating K printing masters for reproducing an electronic image having colour pixels, each colour pixel being represented by K spatially corresponding component pixels, K>1, each component pixel having an input pixel value, the printing masters being capable of rendering Nj intensity levels for a component pixel $1 \leq j \leq K$, thereby defining $N1*N2* \ldots *NK$ intensity level combinations, the method comprising the steps of:

computing for any colour pixel a scalar value which is a function of at least one of said input pixel values of said spatially corresponding component pixels;

quantizing said scalar value by a multilevel halftoning process to obtain for said colour pixel a quantized scalar value;

using said quantized scalar value to select, out of all said intensity level combinations, a subset of intensity level combinations;

selecting one combination out of said subset;

using said selected combination for creating K printing masters by:

providing K printing master precursors, selectively creating ink-carrying and non ink-carrying areas on said printing master precursors according to the selected combination by means of an inkjet printing system printing dots on the printing master precursors.

2. The method according to claim 1 wherein the printing masters are planographic printing plates and wherein the printed inkjet dots generate hydrophobic and hydrophilic areas.

3. The method according to claim 1 wherein said scalar value represents brightness or amount of ink allocation.

4. The method according to claim 1 wherein said scalar value is a linear combination of said input pixel values of at least two of said K colour components.

5. The method according to claim 1 wherein the selection of one combination out of said subset is done using a sub-dot phase modulation error diffusion algorithm causing the position of the inkjet dots to be controlled with an increment that is less than the size of the smallest inkjet dot.

6. The method according to claim 5 wherein the position of the inkjet dots can be controlled according to the pixel grid generated by the addressability of the inkjet printing system and the area of the smallest inkjet dot correspond to the area of 3×3 pixels of the pixel grid.

7. The method according to claim 5 wherein the error diffusion algorithm comprises a imprint function dynamically influencing the threshold values in the error diffusion algorithm.

8. The method according to claim 1 wherein the inkjet printing system is a multilevel inkjet printing system.

9. The method according to claim 1 wherein the inkjet printing system uses at least two different dot sizes.

10. An inkjet printing master made by the method according to claim 1.

11. An system for creating K printing masters for reproducing an electronic image having colour pixels, each colour pixel being represented by K spatially corresponding component pixels, K>1, each component pixel having an input pixel value, the printing masters being capable of rendering Nj intensity levels for a component pixel $1 \leq j \leq K$, thereby defining $N1*N2* \ldots *NK$ intensity level combinations, the system comprising:

means for computing for any colour pixel a scalar value which is a function of at least one of said input pixel values of said spatially corresponding component pixels;

means for quantizing said scalar value by a multilevel halftoning process to obtain for said colour pixel a quantized scalar value;

selections means for using said quantized scalar value to select, out of all said intensity level combinations, a subset of intensity level combinations;

means for selecting one combination out of said subset;

means for using said selected combination for creating K printing masters having:

means for providing K printing master precursors, an inkjet printing system for selectively creating ink-carrying and non ink-carrying areas on said printing master precursors according to the selected combination by printing dots on the printing master precursors thereby obtaining said printing masters.

* * * * *